United States Patent
Kageyama

(10) Patent No.: US 11,710,004 B2
(45) Date of Patent: Jul. 25, 2023

(54) CARD READER AND FOREIGN OBJECT DETECTION METHOD FOR CARD READER

(71) Applicant: Hitachi Channel Solutions, Corp., Tokyo (JP)

(72) Inventor: Takeshi Kageyama, Tokyo (JP)

(73) Assignee: HITACHI CHANNEL SOLUTIONS, CORP., Tokyo (JP)

( * ) Notice: Subject to any disclaimer, the term of this patent is extended or adjusted under 35 U.S.C. 154(b) by 0 days.

(21) Appl. No.: 17/590,146

(22) Filed: Feb. 1, 2022

(65) Prior Publication Data
US 2022/0391604 A1 Dec. 8, 2022

(30) Foreign Application Priority Data

Jun. 4, 2021 (JP) .................................. 2021-094483

(51) Int. Cl.
| | |
|---|---|
| *G06K 7/00* | (2006.01) |
| *G07F 19/00* | (2006.01) |
| *G06K 7/08* | (2006.01) |
| *G07F 7/08* | (2006.01) |
| *G06Q 20/34* | (2012.01) |

(52) U.S. Cl.
CPC ............ *G06K 7/0069* (2013.01); *G06K 7/08* (2013.01); *G07F 7/0873* (2013.01); *G07F 19/2055* (2013.01); *G06Q 20/34* (2013.01)

(58) Field of Classification Search
CPC .......... G06K 13/0875; G06K 13/0868; G06K 7/0069; G06K 7/08; G07F 7/0873; G06Q 20/34
See application file for complete search history.

(56) References Cited

U.S. PATENT DOCUMENTS

| | | | | |
|---|---|---|---|---|
| 4,019,099 A | * | 4/1977 | Calabro | H05K 7/1418 |
| | | | | 361/756 |
| 4,449,775 A | * | 5/1984 | de Pommery | G06K 7/0017 |
| | | | | 439/325 |

(Continued)

FOREIGN PATENT DOCUMENTS

| | | |
|---|---|---|
| JP | 2017-219971 A | 12/2017 |
| JP | 2020-024537 A | 2/2020 |

OTHER PUBLICATIONS

India Office Action dated Mar. 14, 2023 for Indian Patent Application No. 202214008266.

*Primary Examiner* — Daniel I Walsh
(74) *Attorney, Agent, or Firm* — Volpe Koenig

(57) ABSTRACT

A card reader includes a card conveyance path comprising upper and a lower conveyance paths to convey a card inserted into a device; and a reading unit that reads information on the card. Lower concave and convex portions are provided on an upper surface of the lower conveyance path behind the reading unit. Upper concave and convex portions are provided on a lower surface of the upper conveyance path to be fitted to the lower concave and convex portion. A pressing unit provides a fitted state of the lower and upper concave and convex portions when no object is present. A detection sensor detects a state where an interval between the lower and upper concave and convex portions is widened. The detection sensor detects the state where the interval is widened, to recognize that an object is inserted between the lower and upper concave and convex portions.

15 Claims, 16 Drawing Sheets

(56) References Cited

U.S. PATENT DOCUMENTS

| | | | | |
|---|---|---|---|---|
| 4,489,359 A * | 12/1984 | Suzuki | E05B 49/008 | 70/277 |
| 5,055,061 A * | 10/1991 | Lichtenwalter | H01R 12/7005 | 361/802 |
| 5,537,401 A * | 7/1996 | Tadamura | H04L 12/2854 | 370/409 |
| 5,760,380 A * | 6/1998 | May | G07F 19/20 | 235/475 |
| 5,850,079 A * | 12/1998 | Ohwa | G06K 7/084 | 235/475 |
| 6,089,919 A * | 7/2000 | Nishioka | G06K 7/015 | 439/630 |
| 6,267,295 B1 * | 7/2001 | Amagai | G06K 7/003 | 235/475 |
| 6,464,537 B1 * | 10/2002 | Letourneau | H01R 12/714 | 439/607.14 |
| 6,491,216 B1 * | 12/2002 | May | G07F 19/20 | 235/475 |
| 6,663,433 B1 * | 12/2003 | Lloyd | G06K 19/07739 | 439/923 |
| 7,628,653 B2 * | 12/2009 | Zhang | H01R 27/00 | 439/630 |
| 7,628,655 B1 * | 12/2009 | Chen | H01R 12/721 | 439/60 |
| 8,931,698 B2 | 1/2015 | Ishikawa et al. | | |
| 10,360,416 B1 * | 7/2019 | Dant | G06K 7/0056 | |
| 10,595,429 B2 * | 3/2020 | Miura | H05K 7/1427 | |
| 2004/0020991 A1 * | 2/2004 | Hirasawa | G06K 13/0875 | 235/479 |
| 2004/0035929 A1 * | 2/2004 | Okada | G06Q 20/341 | 235/438 |
| 2004/0262389 A1 * | 12/2004 | Nagata | G06K 13/085 | 235/441 |
| 2005/0218227 A1 * | 10/2005 | Takita | G06K 13/08 | 235/441 |
| 2006/0054700 A1 | 3/2006 | May | | |
| 2007/0034698 A1 * | 2/2007 | Hautvast | G06K 13/08 | 235/475 |
| 2009/0163081 A1 * | 6/2009 | Zhang | H01R 27/00 | 439/630 |
| 2012/0234916 A1 * | 9/2012 | Orii | G06K 13/08 | 235/437 |
| 2013/0062410 A1 * | 3/2013 | Mitchell | G07F 19/209 | 235/449 |
| 2013/0119136 A1 * | 5/2013 | Ishikawa | G07F 19/2055 | 235/476 |
| 2013/0223022 A1 * | 8/2013 | Kim | H05K 7/00 | 312/334.1 |
| 2013/0299582 A1 * | 11/2013 | Ozawa | G06K 7/084 | 235/440 |
| 2015/0115031 A1 * | 4/2015 | Hoson | G06K 13/0868 | 235/449 |
| 2015/0340784 A1 * | 11/2015 | Moriyasu | H01R 12/75 | 439/630 |
| 2016/0070939 A1 * | 3/2016 | Bytheway | G01R 27/2605 | 235/438 |
| 2016/0140366 A1 * | 5/2016 | Tanaka | G06K 7/0021 | 235/449 |
| 2016/0162712 A1 * | 6/2016 | Ozawa | G06K 7/084 | 235/440 |
| 2017/0351880 A1 | 12/2017 | Ozawa et al. | | |
| 2019/0138761 A1 * | 5/2019 | Akahane | G06K 7/10 | |
| 2019/0220637 A1 * | 7/2019 | Kitazawa | G06K 7/10366 | |
| 2019/0306355 A1 * | 10/2019 | Matsue | H04N 1/00559 | |
| 2019/0384945 A1 * | 12/2019 | Momose | G06K 7/0008 | |
| 2019/0384946 A1 * | 12/2019 | Momose | G06K 7/10 | |
| 2019/0385028 A1 * | 12/2019 | Ozawa | G07D 11/225 | |
| 2020/0050803 A1 * | 2/2020 | Mochida | G01S 17/04 | |
| 2020/0126368 A1 * | 4/2020 | Ozawa | G06K 7/081 | |
| 2020/0134985 A1 * | 4/2020 | Fujimoto | G06K 7/084 | |
| 2020/0349327 A1 * | 11/2020 | Takahashi | G06K 13/0868 | |
| 2020/0387679 A1 * | 12/2020 | Miyazawa | G06K 13/0868 | |
| 2022/0245617 A1 * | 8/2022 | Momose | G06Q 20/341 | |

* cited by examiner

CARD READER AND FOREIGN OBJECT DETECTION METHOD FOR CARD READER

BACKGROUND OF THE INVENTION

1. Field of the Invention

The present invention relates to a card reader and a foreign object detection method for a card reader.

2. Description of the Related Art

In a transaction processing device such as an automated teller machine (ATM), a skimming device (skimmer) is installed inside a card reader to illegally acquire information (card information) recorded on a card (so-called skimming).

In skimming, in many cases, a method is performed in which an illegal read head (magnetic head) is installed to cover a card insertion slot of the card reader and steals the card information. As a countermeasure against such skimming, an interfering magnetic field is generated in the vicinity of the insertion slot, and the interfering magnetic field prevents illegal reading of magnetic data.

By the way, in recent years, in order to avoid the interfering magnetic field generated in the vicinity of the card insertion slot described above, a small and thin skimming device is inserted and installed inside the card insertion slot (behind the read head of the card reader) to illegally acquire the card information while avoiding the interfering magnetic field.

As a countermeasure against such a new skimming skill, for example, a technique for detecting that the skimming device is attached inside the card reader is developed. For example, JP 2020-24537 A (Patent Literature 1) and JP 2017-219971 A (Patent Literature 2) disclose a technique for detecting a foreign object such as a skimming device installed behind a magnetic head of a card reader.

Namely, Patent Literature 1 discloses a technique in which a metal sensor that detects metal is disposed inside a housing of a card reader to detect a foreign metal object such as a skimming device with high accuracy. In addition, Patent Document 2 discloses a technique in which a capacitive sensor is disposed on a back side of a shutter member that closes a card passage (card conveyance path), to detect a skimming device attached inside a card reader.

SUMMARY OF THE INVENTION

When the above-described technique of Patent Literature 1 or Patent Literature 2 is adopted, it is possible to detect a foreign object such as a skimming device attached behind (back side) a reading unit of the card reader.

However, in the above-described techniques, since the metal sensor or the capacitive sensor is used to detect the skimmer, it may be difficult to reliably detect the skimming device (foreign object) depending on the material, the attachment position or the size of a member that covers an electronic circuit of the skimmer. In addition, in recent years, a skimming device that is extremely thin may be attached, and a high-accuracy sensor is required to detect the skimming device, so that the cost increases, which is a problem. In addition, in order to perform reliable detection, a large number of sensors need to be installed over a wide range along a conveyance path, thereby leading to an increase in production cost.

It is therefore an object of the present invention to provide a card reader and a foreign object detection method for a card reader capable of reliably detecting an object attached inside the card reader, with a simple configuration.

In order to achieve the above-described object, according to one aspect of the present invention, there is provided a card reader including: a card conveyance path formed of an upper conveyance path and a lower conveyance path to take a card that is inserted, into a device; and a reading unit that reads information recorded on the card. A lower concave and convex portion is provided on an upper surface of the lower conveyance path of the card conveyance path behind the reading unit, and an upper concave and convex portion is provided on a lower surface of the upper conveyance path to be fitted to the lower concave and convex portion. The lower concave and convex portion and the upper concave and convex portion are configured to maintain a fitted state when no object is present. A detection sensor is provided that detects a change in an interval between the lower concave and convex portion and the upper concave and convex portion.

In addition, according to another aspect of the present invention, there is provided a foreign object detection method for a card reader including a card conveyance path formed of an upper conveyance path and a lower conveyance path to convey a card that is inserted, into a device, and a reading unit that reads information recorded on the card. A lower concave and convex portion provided in the lower conveyance path of the card conveyance path behind the reading unit, and an upper concave and convex portion provided in the upper conveyance path to be fitted to the lower concave and convex portion are provided. The lower concave and convex portion and the upper concave and convex portion are configured to maintain a fitted state when no object is present. A change in an interval between the lower concave and convex portion and the upper concave and convex portion is to be detected. When the card is not inserted and the change in the interval is detected, it is determined that a foreign object is present.

According to the card reader of the present invention, with a simple configuration, it is possible to reliably detect an object mounted inside the card reader. In addition, according to the foreign object detection method for a card reader in the present invention, with a simple configuration, it is possible to reliably detect that the object is a foreign object.

DETAILED DESCRIPTION OF THE PREFERRED EMBODIMENTS

Figure 1:
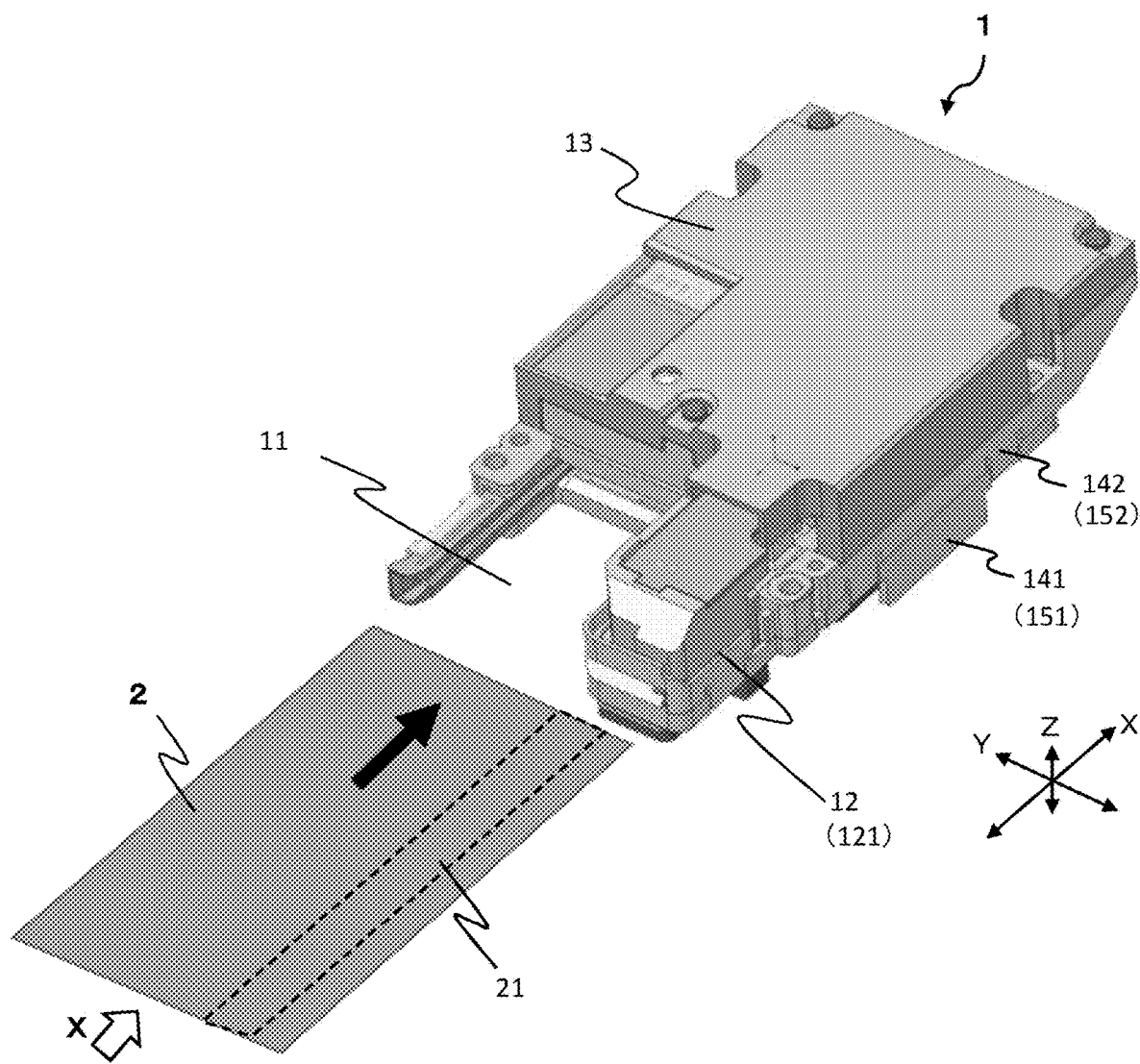
FIG. 1 is an exterior perspective view of a card reader in a first embodiment of the present invention.

Hereinafter, the present invention will be described in more detail with reference to specific embodiments. Incidentally, the present invention is not limited to the embodiments to be described below. Namely, the present invention can be modified in various modes including the embodiments to be described below. In addition, in the drawings used in the following description, the same reference signs (numbers) are used for the same parts or components, a description of parts or components that have already been described may be omitted.

First Embodiment

Figure 2:
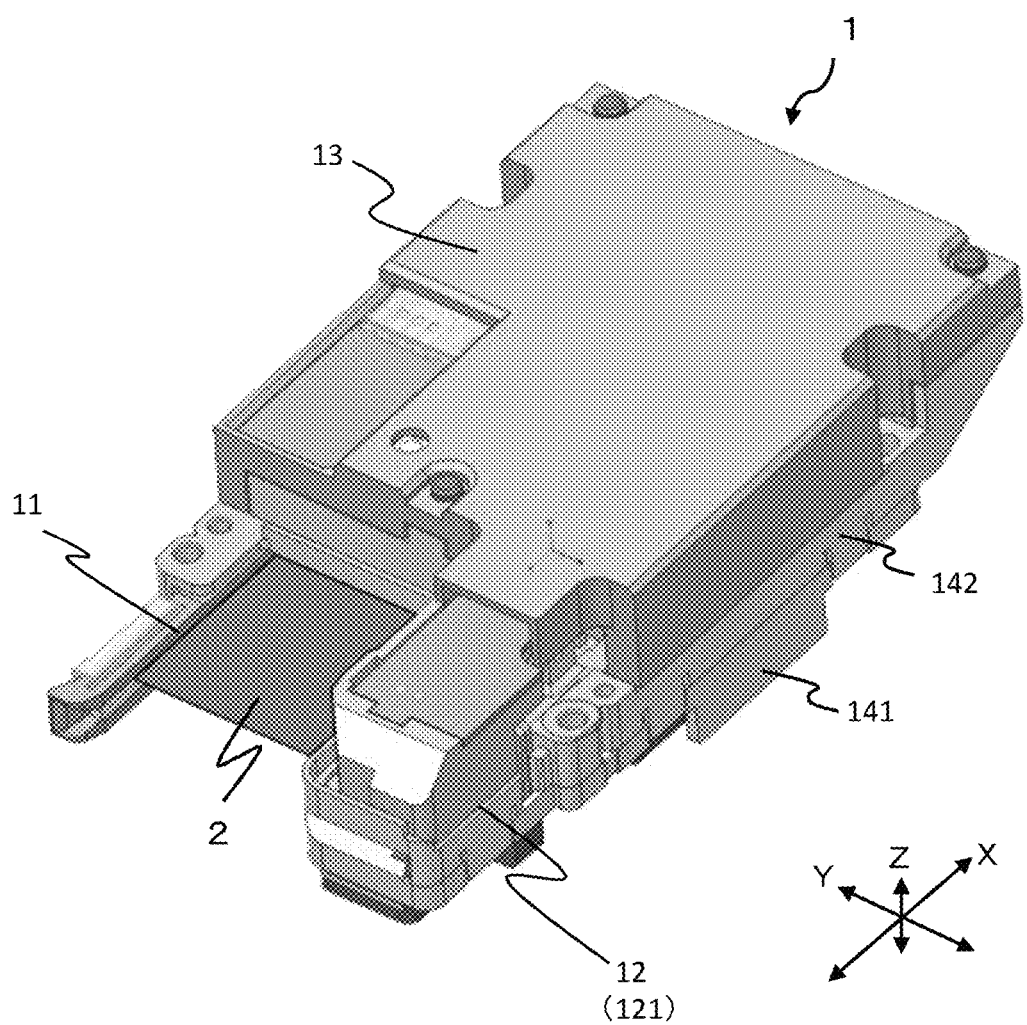
FIG. 2 is an exterior perspective view of the card reader into which a card is inserted in the first embodiment.
Figure 3:
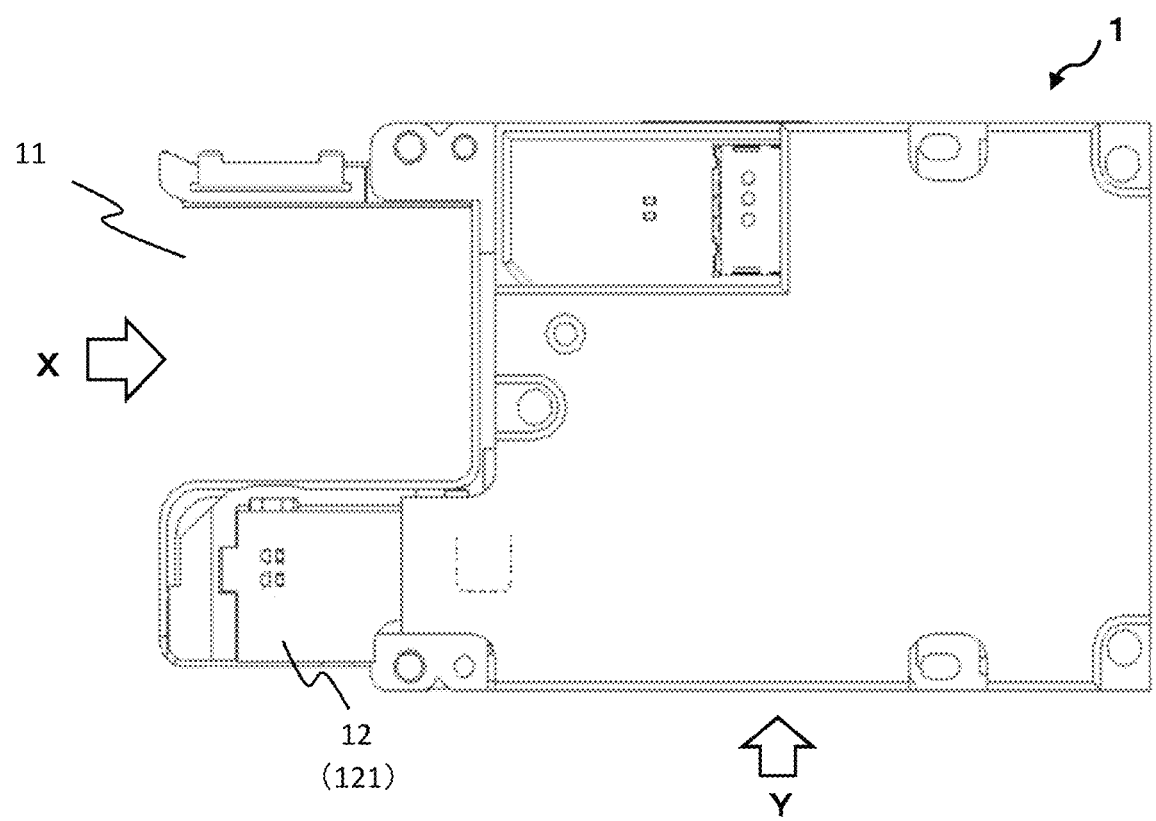
FIG. 3 is a top view of the card reader in the first embodiment.
Figure 4:
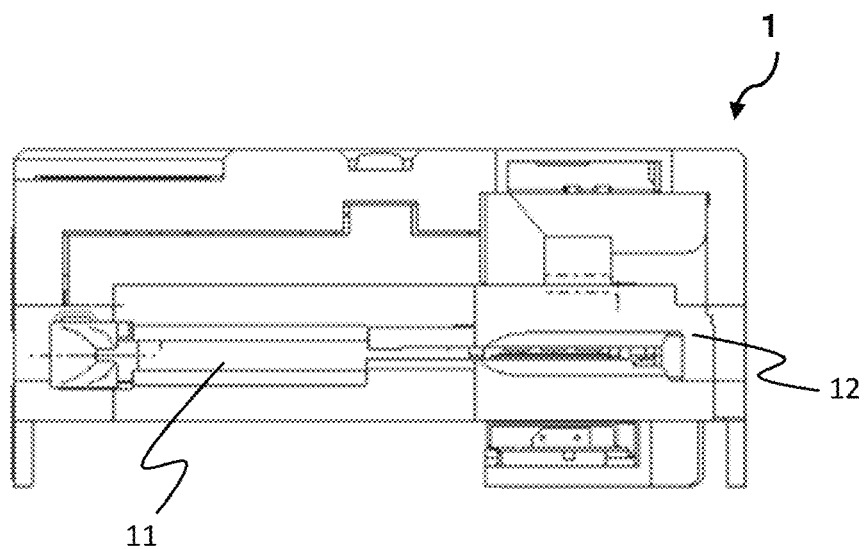
FIG. 4 is a front view of the card reader in the first embodiment.
Figure 5:
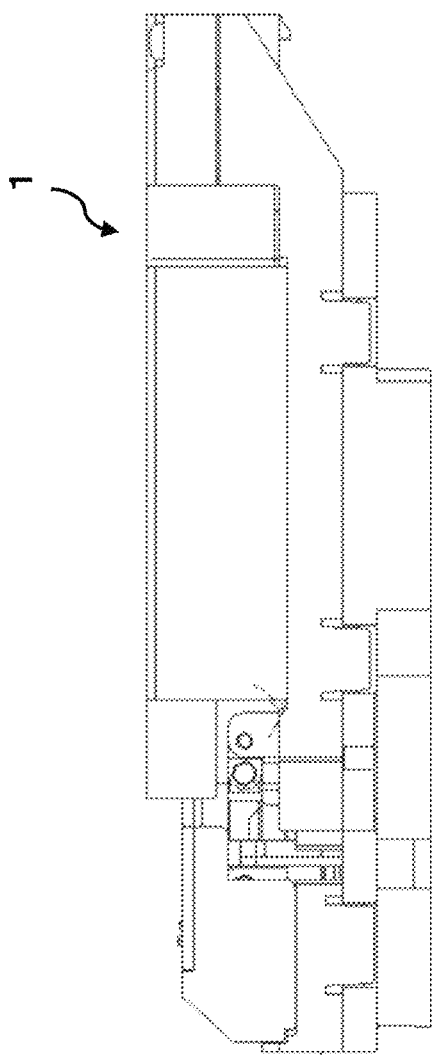
FIG. 5 is a side view of the card reader in the first embodiment.

Next, a first embodiment will be described with reference to FIGS. 1 to 14. FIGS. 1 and 2 are exterior perspective views of a card reader in the first embodiment. FIG. 3 is a top view of the card reader, FIG. 4 is a front view seen from a card insertion slot side, and FIG. 5 is a side view seen from the side. FIGS. 6A to 6D are views for describing a basic concept of a foreign object detection method, and FIGS. 7A and 7B are views for describing a foreign object detection method in the first embodiment of the present invention. FIGS. 8A to 12C are views illustrating a specific configuration of the first embodiment of the present invention. Incidentally, in the drawings, a direction where a card is conveyed is an X direction, a width direction of the card is a Y direction, and a direction (up-down direction) perpendicular to a card conveyance path is a Z direction.

First, the exterior and the function of a card reader will be described with reference to FIGS. 1 to 5. In FIGS. 1 to 5, a card reader 1 includes a card insertion slot 11. In addition, the card reader 1 includes a lower frame 141 and an upper frame 142, and a card conveyance path 15 for conveying a card is formed inside the card reader 1. The card conveyance path 15 is configured to include a lower conveyance path 151 formed in the lower frame 141, and an upper conveyance path 152 formed in the upper frame 142. Incidentally, the card conveyance path 15 includes a drive mechanism for conveyance. An upper lid is denoted by reference sign 13, and a printed substrate 14 is disposed on a lower surface of the upper lid 13.

In FIG. 1, a card 2 has a surface on which an arrow indicating a card insertion direction is illustrated, as a front surface, and has an opposite surface as a back surface. A magnetic stripe 21 is formed on the back surface of the card 2. Information required to handle an account number, a password, and the like (hereinafter, "card information") is recorded on the magnetic stripe 21. The card 2 is inserted from the card insertion slot 11 in the X direction by a user, and is conveyed into the card reader 1 by the card conveyance path 15. The card 2 is inserted with the front surface set facing upward. During the conveyance, the card information recorded on the magnetic stripe 21 provided on the back surface of the card 2 is read by a reading unit (here, magnetic head 121) provided inside a protruding portion 12 in the right vicinity of the card insertion slot. The magnetic head 121 is disposed at a position where the magnetic head 121 is capable of reading the card information recorded on the magnetic stripe 21 of the card 2. FIG. 2 illustrates a state where the card 2 is inserted into a back of the card reader 1. In addition, FIG. 3 is a top view of the card reader 1, FIG. 4 is a front view seen in a direction of arrow X in FIG. 3, and FIG. 5 is a side view seen in a direction of arrow Y. The card information that is read is used for transactions or the like between the user and a financial institution. Thereafter, in order to return the card 2 to the user, the card reader 1 drives a drive mechanism (not illustrated) to convey (carry out) the card 2 from the conveyance path to the card insertion slot 11.

Incidentally, in this embodiment, a magnetic card is illustrated as the card, but the present invention is not limited to the magnetic card. For example, the present invention is also applicable to a card reader that reads card information of an IC card in which information is recorded in an IC.

For example, a wrongdoer who performs skimming inserts a skimmer provided with a thin magnetic head, into a rear side of the magnetic head 121 from the card insertion slot 11 and installs the skimmer on the rear side. The present invention provides a card reader that simply and reliably detects such an object even when the skimmer (skimming device) is installed in such a manner.

When a foreign object such as a skimmer is inserted into the card reader by someone, in the present invention, a foreign object can be detected without using a metal sensor or a capacitive sensor. Next, a basic concept for that purpose will be described with reference to FIGS. 6A to 6D. FIGS. 6A to 6D are cross-sectional views illustrating a portion of the card conveyance path on a side surface (corresponding to FIG. 5) of the card reader 1.

Figure 6A:
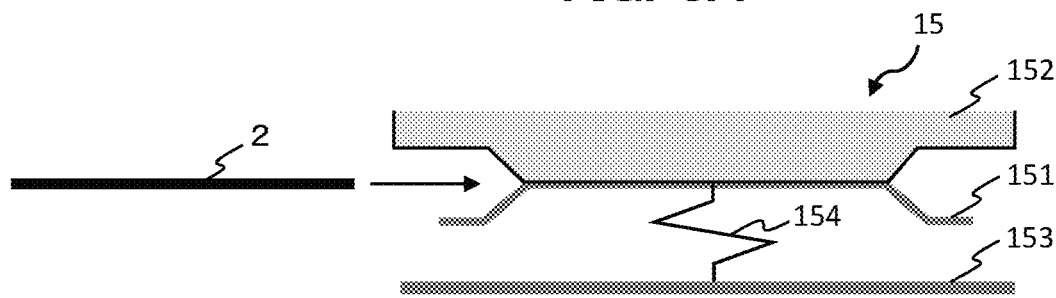
FIGS. 6A to 6D are views describing a basic foreign object detection method.
Figure 7A:
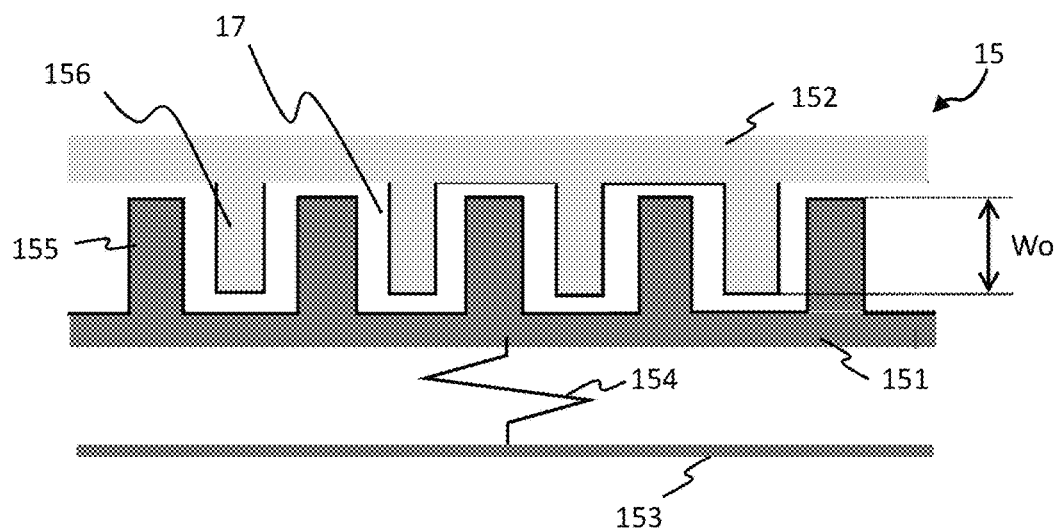
FIGS. 7A and 7B are views describing a foreign object detection method in the first embodiment.
Figure 7B:
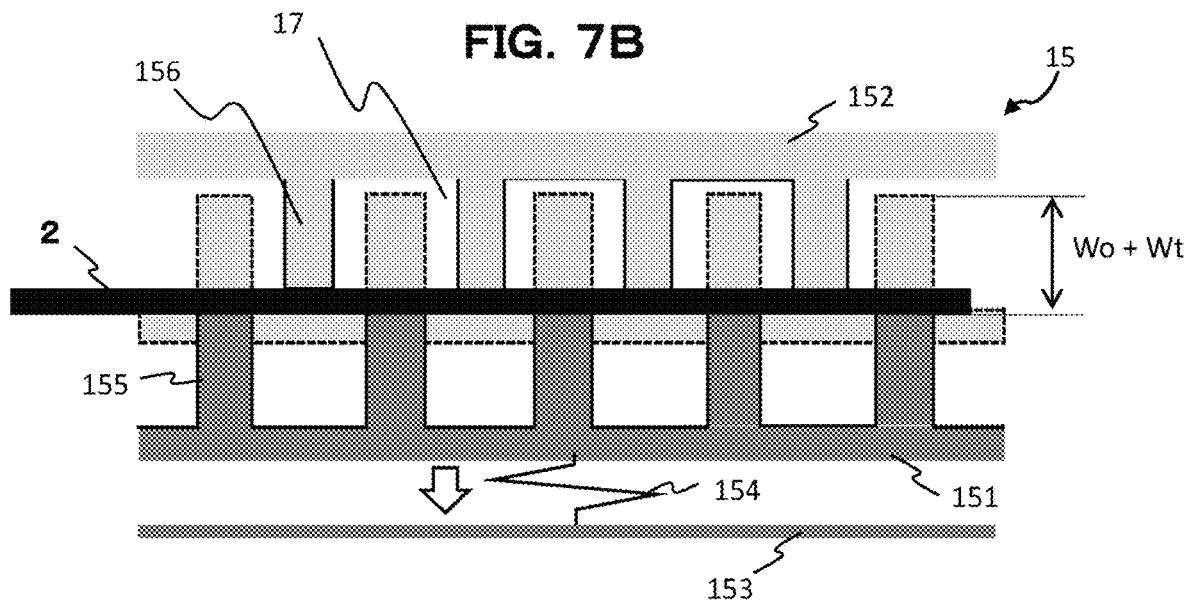

First, as illustrated in FIG. 6A, the card conveyance path 15 includes the lower conveyance path 151 and the upper conveyance path 152. The lower conveyance path 151 is pressed against an upper conveyance path 152 side by a pressing unit 154 such as a spring attached to a base 153. Namely, when the card is not inserted, there is no interval (gap) between the lower conveyance path 151 and the upper conveyance path 152. Incidentally, in this embodiment, the lower conveyance path 151 is disposed in the lower frame 141, and the upper conveyance path 152 is disposed in the upper frame 142.

Figure 6B:
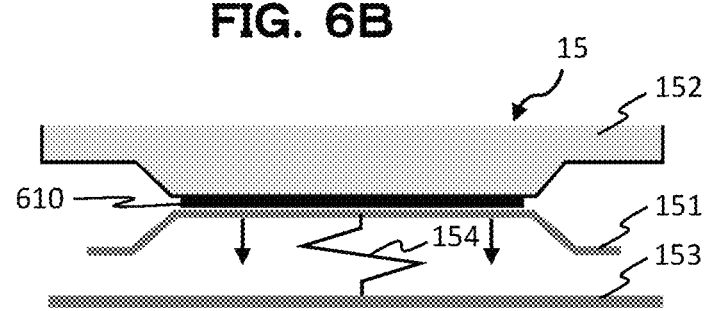

Next, as illustrated in FIG. 6B, when the card 2 is inserted from the card insertion slot 11 in the X direction (right direction in the drawing), the lower conveyance path 151 moves by a thickness of the card 2 in a down direction, and the card is inserted. Incidentally, if a card detection sensor (for example, an optical sensor) to be provided in the vicinity of the card insertion slot is provided, whether or not the card is inserted can be recognized by a detection signal of the card detection sensor. Here, the card detection sensor is not illustrated.

Figure 6C:
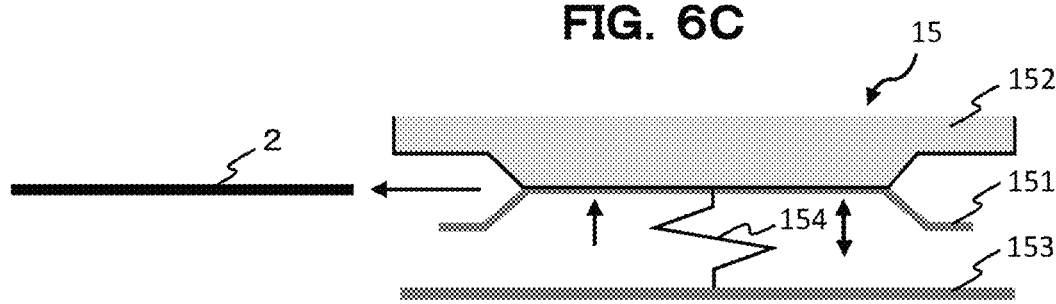

Then, as illustrated in FIG. 6C, when the card 2 is removed, the lower conveyance path 151 returns to the original position by means of an action of the pressing unit 154. In such a manner, when a foreign object such as a skimmer is not inserted, the gap (interval) between the lower conveyance path 151 and the upper conveyance path 152 is generated only when the card is inserted, and the gap returns to zero when the card is not inserted.

Figure 6D:
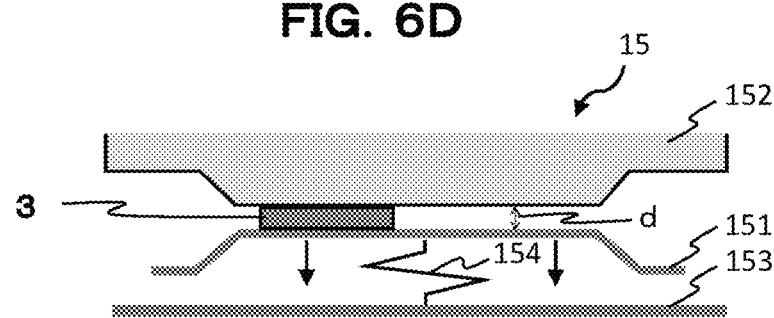

Here, as illustrated in FIG. 6D, in a case where a foreign object 3 such as a skimmer is inserted when a transaction is not performed (when the card is not inserted), the lower conveyance path 151 is displaced downward by a thickness d of the foreign object 3. The insertion of the foreign object can be recognized (detected) by detecting the displacement amount, namely, the presence of an interval d between the conveyance paths.

However, there is actually present a skimming device having an extremely thin thickness similarly to a razor blade. When such a skimming device that is extremely thin is installed in the card conveyance path 15, a sensor having extremely high detection accuracy needs to be used to accurately detect a displacement of a very small interval, and special means for suppressing design tolerances as much as possible needs to be conceived. However, it is difficult to improve the detection accuracy to a certain level or higher, and the minimizing of design tolerances leads to an increase in production time, and accordingly to an increase in production cost, which is not practical. Further, even if the detection accuracy or the design accuracy can be improved to the limit, a new problem such as a high possibility of false detection may occur.

Therefore, the first embodiment of the present invention adopts a new configuration in which an object (foreign object) can be reliably detected by increasing a change in the interval between the lower conveyance path 151 and the upper conveyance path 152 forming the card conveyance path 15 even when the thickness of the object is extremely small.

Next, the foreign object detection method in the first embodiment will be described with reference to FIGS. 7A and 7B. As can be seen from FIGS. 7A and 7B, in this embodiment, a lower concave and convex portion 155 having a concave and convex cross section in the width direction is provided on an upper surface of the lower conveyance path 151. A height Wo of the lower concave and convex portion 155 is set to be larger than a thickness Wt of the card. Namely, Wo>Wt. For example, Wo is set to be two times or more Wt. The lower concave and convex portion 155 is provided behind (back side) the reading unit in a conveyance direction X. In addition, an upper concave and convex portion 156 is provided on a lower surface (surface on a lower conveyance path side) of the upper conveyance path 152 to mesh with (be fitted to) the lower concave and convex portion 155. The upper and lower concave and convex portions may be obtained by forming conveyance path surfaces in a concave and convex shape, or may be obtained by forming separate concave and convex members on conveyance path surfaces. In addition, the upper and lower concave and convex portions may be provided over the entirety of the conveyance path in the width direction; however, since it is sufficient if it is possible to detect a foreign object such as a skimmer installed on the rear side of the reading unit, the upper and lower concave and convex portions may not be provided over the entirety of the conveyance path in the width direction as long as the upper and lower concave and convex portions each have a width equal to or wider than a reading range of the reading unit. The lower concave and convex portion 155 and the upper concave and convex portion 156 are configured to maintain a fitted state when no object is present. Here, in order to simplify the description, a configuration is illustrated in which the lower concave and convex portion 155 is pressed upward from below by the pressing unit 154 such as a spring to maintain a fitted state of the upper and lower concave and convex portions. For this reason, in a state where there is no object, the lower concave and convex portion 155 and the upper concave and convex portion 156 maintain a fitted state. Namely, in this embodiment, a "detection guide 17" including the lower concave and convex portion 155 and the upper concave and convex portion 156 is provided, and the pressing unit 154 is provided to generate a force to push up the lower concave and convex portion 155 from a lower side such that the lower concave and convex portion 155 and the upper concave and convex portion 156 maintain a fitted state when no object is present. Incidentally, the configuration for maintaining a fitted state of the upper and lower concave and convex portions is not limited to the example illustrated here.

In such a manner, since the detection guide 17 including the lower concave and convex portion 155 and the upper concave and convex portion 156 is provided behind the reading unit, as illustrated in FIG. 7A, when no object is inserted, the lower concave and convex portion 155 and the upper concave and convex portion 156 are in a meshed state (fitted state). Namely, in a state where the card 2 is not inserted into the card reader 1, the lower concave and convex portion 155 is pushed up by the pressing unit 154, and the lower concave and convex portion 155 and the upper concave and convex portion 156 are in a close contact state (fitted state), so that the vertical interval is minimized.

On the other hand, as illustrated in FIG. 7B, in a state where the card 2 is inserted into the card insertion slot and conveyed into the card reader 1, a gap between surfaces of convex portions of the concave and convex portions is widened by the thickness of the card. Namely, due to the insertion of the card, an interval W between the lower concave and convex portion 155 and the upper concave and convex portion 156 becomes equal to Wo+Wt that is the sum of the height Wo of the concave and convex portion and of the thickness Wt of the card.

The amount of a change in the interval between both the conveyance paths at a transition from a state where the card is not inserted illustrated in FIG. 7A to a state where the card is inserted illustrated in FIG. 7B can be set to a larger value in each stage compared to when the detection guide 17 formed of the upper and lower concave and convex portions is not provided (the case of FIGS. 6A to 6D). Regarding a change in the interval, even if an object that is extremely thinner than the thickness of the card (thickness of the foreign object is substantially zero) is inserted between the conveyance paths, a change is generated which is equal to or more than an interval of the height Wo of the concave and convex portion. When any object (regardless of whether the object is a card or a foreign object) is present, such a configuration causes a large change in the interval. Therefore, in a case where the card 2 is not inserted into the card reader 1, when a large interval W is generated between the upper and lower concave and convex portions, it can be determined that any foreign object other than the card is installed.

In such a manner, in the case of the card conveyance path including the detection guide 17 formed of the upper and lower concave and convex portions, even when an object is extremely thin, the interval between the lower concave and convex portion 155 and the upper concave and convex portion 156 changes greatly as long as the object has a certain rigidity. For this reason, the detection sensor that detects a change in the interval may be a simple detection sensor having low detection accuracy that is capable of detecting whether or not a change in the interval is generated. As such a detection sensor, for example, an optical sensor capable of detecting the shielding and reception of light depending on the presence or absence of a detection body, a proximity sensor that detects whether or not a detection body is proximate thereto, or the like can be used.

Figure 8A:
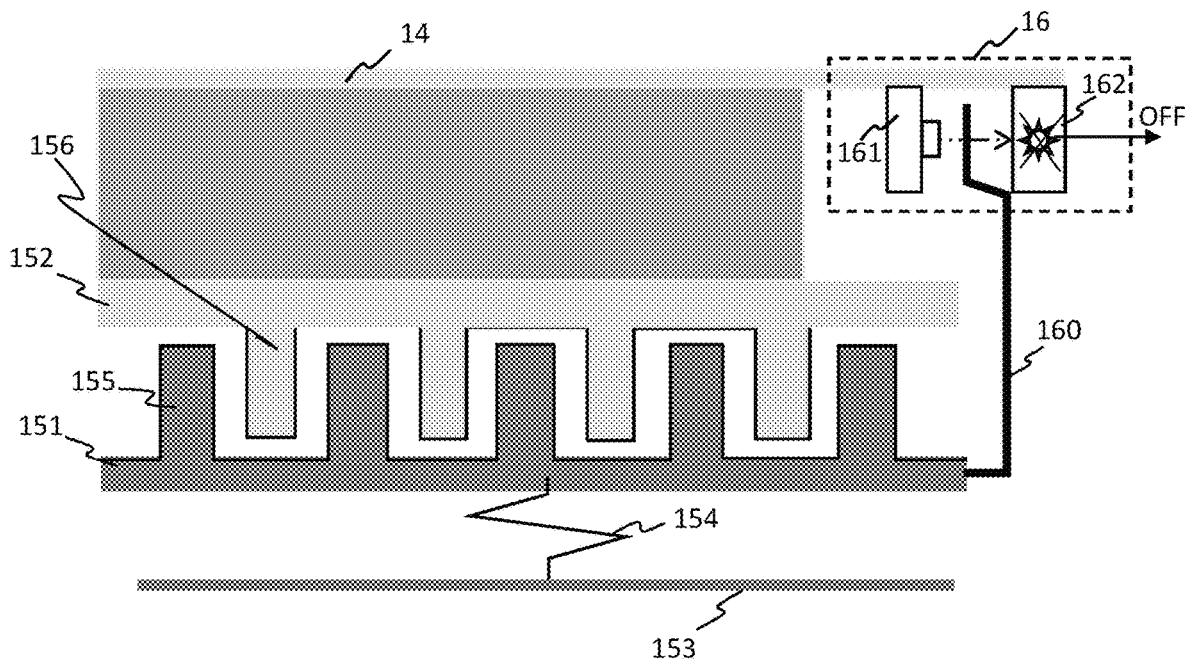
FIGS. 8A and 8B are views describing the foreign object detection method in the first embodiment.
Figure 8B:
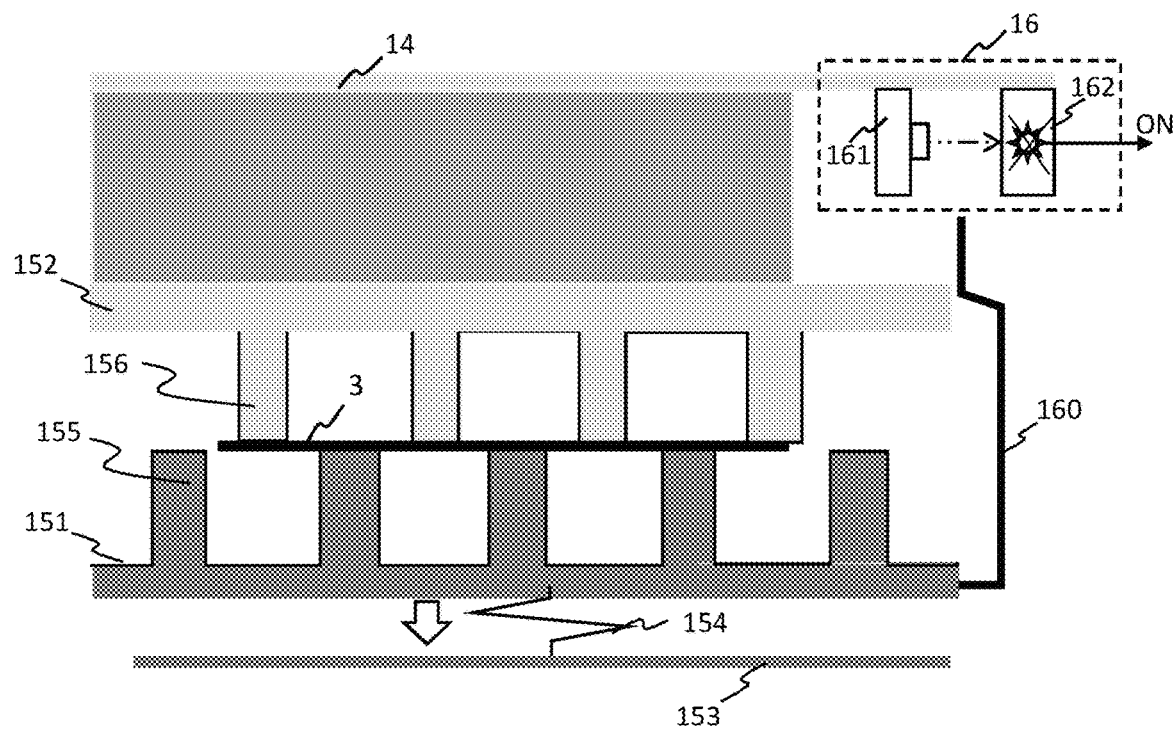

Next, a specific configuration example of the detection sensor which detects that the interval between the lower concave and convex portion and the upper concave and convex portion is changed by the insertion of a foreign object will be described with reference to schematic views illustrated in FIGS. 8A and 8B. As illustrated in FIG. 8A, an optical sensor 16 including a light-emitting unit 161 and a light-receiving unit 162 is attached to the printed substrate 14 connected to the upper conveyance path 152. A light-shielding plate 160 is attached to the lower conveyance path 151 to prevent the light-receiving unit 162 from receiving light from the light-emitting unit 161 (to shield light) when the interval (gap) between the upper and lower conveyance paths is minimized. The light-shielding plate 160 functions as a detection body for detecting a change in the interval between the lower concave and convex portion 155 and the upper concave and convex portion 156. When the card is not inserted, the optical sensor 16 is turned off (light shielding state) by the light-shielding plate 160. As illustrated in FIG. 8B, when the card 2 or the foreign object 3 is inserted into the card conveyance path 15, the lower conveyance path 151 is pushed down against a spring force and accordingly, the light-shielding plate 160 is also lowered, and light from the light-emitting unit 161 is detected by the light-receiving unit 162, so that the optical sensor 16 is turned on (light projection state). The ON and OFF states of the optical sensor 16 occur not only when the card is inserted but also when the foreign object 3 is inserted. Namely, the optical sensor is turned off in a state where there is no object, and the optical sensor is turned on in a state where an object is present. Therefore, the optical sensor 16 is turned on in a state where the card 2 is not inserted, so that it can be detected (determined) that the foreign object 3 is inserted.

Incidentally, FIGS. 8A and 8B illustrate an example in which the light-shielding plate 160 that is a detection body is attached to the lower conveyance path 151 and the optical sensor 16 is installed on the upper conveyance path 152 side, but on the contrary, the optical sensor may be attached to the lower conveyance path, and the light-shielding plate 160 may be attached to the upper conveyance path. In addition, here, the case of using the optical sensor has been described, but a sensor other than the optical sensor may be used. For example, the present invention can also be carried out by using, for example, a proximity sensor (proximity switch) that detects whether or not a detection body is proximate thereto. Namely, the present invention can be realized as long as the detection sensor is capable of detecting a change in the interval between the upper and lower concave and convex portions.

Next, a specific structure of the card reader 1 in the first embodiment of the present invention will be described with reference to FIGS. 9 to 14 on the premise roughly described above.

Figure 9:
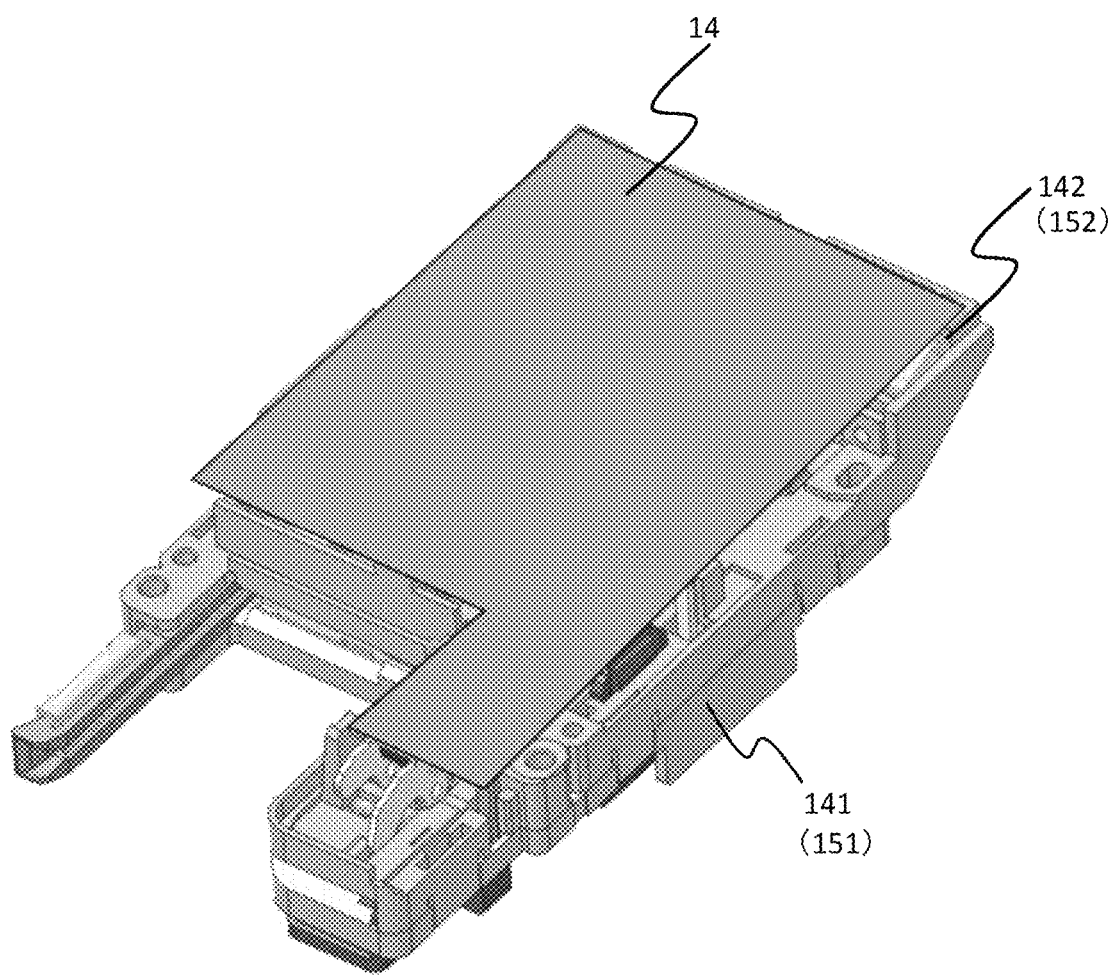
FIG. 9 is an internal perspective view of the card reader in the first embodiment.

FIG. 9 is a view illustrating the card reader 1 in a state where the upper lid 13 is removed therefrom in FIG. 1, and the card reader 1 includes the upper frame 142 including the printed substrate 14 on which a main control circuit and the like are mounted, and the upper conveyance path 152, and the lower frame 141 including the lower conveyance path 151.

Figure 10:
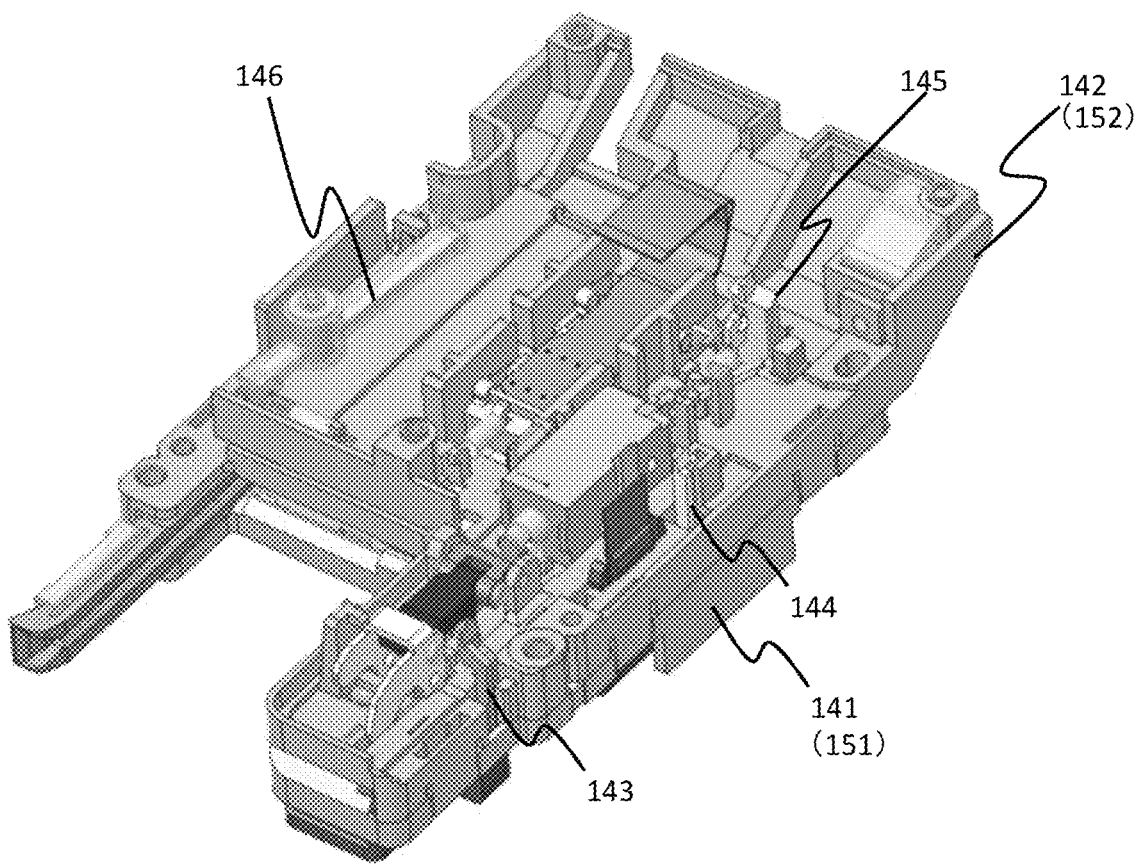
FIG. 10 is an internal perspective view of the card reader in the first embodiment.

FIG. 10 is a view illustrating a state where the printed substrate 14 is removed in FIG. 9. Light-shielding levers 143 and 144 that are detection bodies to move up and down together with the lower conveyance path 151 included in the lower frame 141 protrude from a lower frame 141 side via holes in the upper frame 142 including the upper conveyance path 152. In addition, the upper frame 142 includes an insertion-detecting lever 146 which detects that the card 2 is inserted from the card insertion slot 11, and a card insertion completion-detecting lever 145 which detects that the card is inserted into the back. Whether or not the card 2 is inserted into the card reader 1 can be detected by the insertion-detecting lever 146 and the card insertion completion-detecting lever 145.

Figure 11:
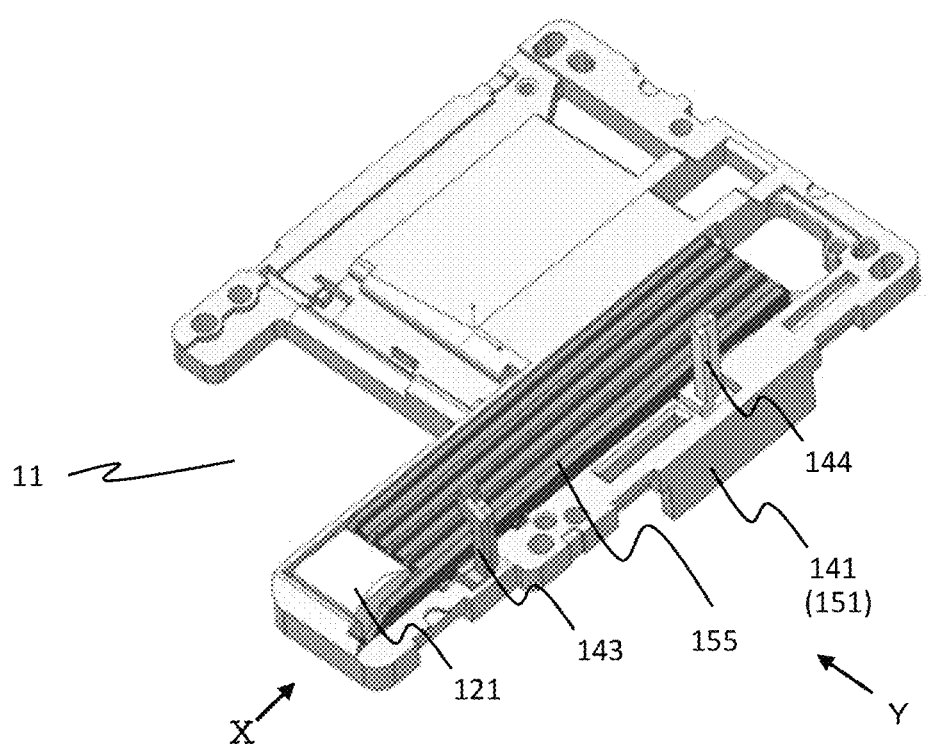
FIG. 11 is an internal perspective view of the card reader in the first embodiment.

FIG. 11 is a view illustrating the lower frame 141 in a state where the upper frame 142 is removed therefrom in FIG. 10. The lower frame 141 includes the lower conveyance path 151, and the lower concave and convex portion 155 is provided on the upper surface of the lower conveyance path 151. Incidentally, in this embodiment, the lower concave and convex portion 155 is configured separately from the lower conveyance path 151, but may be configured integrally with the lower conveyance path 151 as illustrated in FIGS. 7A to 8B. The lower concave and convex portion 155 is disposed on the rear side (back side) of the magnetic head 121 that is a reading unit, and the pressing unit generates an upward pressing force. The light-shielding levers 143 and 144 (having the same function as that of the light-shielding plate 160) are attached to the lower concave and convex portion 155 or to the lower conveyance path 151, and move synchronously with (in response to) a movement of the lower concave and convex portion 155 in the up-down direction.

Figure 12A:
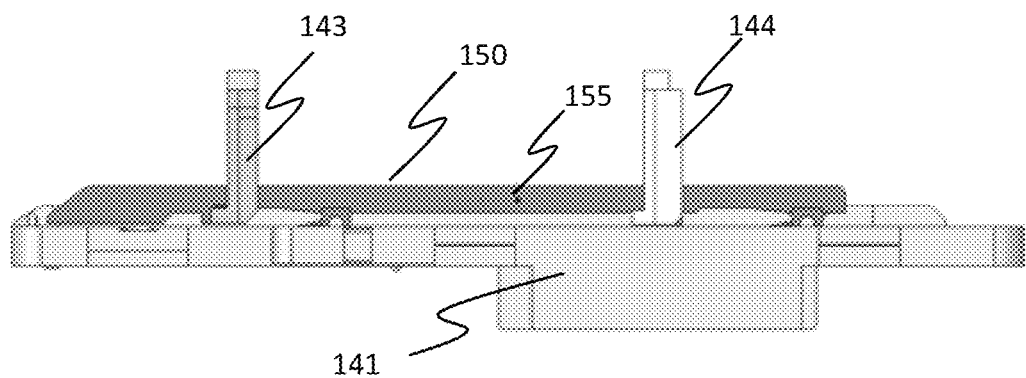
FIGS. 12A to 12C are internal side views of the card reader in the first embodiment.
Figure 12B:
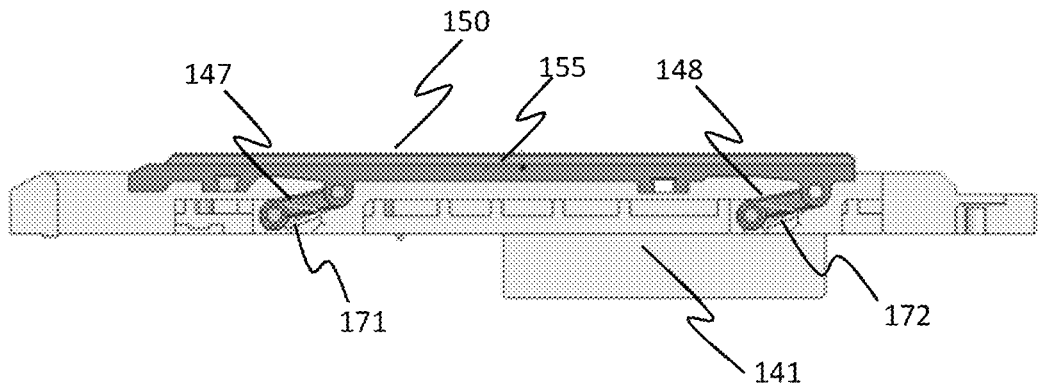
Figure 12C:
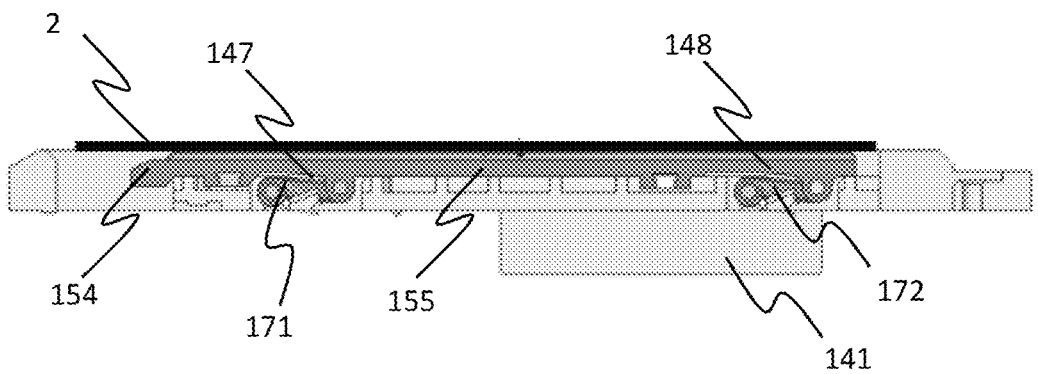

FIGS. 12A to 12C are side views of the lower frame 141 in FIG. 11. As illustrated in FIG. 12A, the light-shielding levers 143 and 144 are connected to the lower concave and convex portion 155, and move up and down synchronously with (in response to) a movement of the lower concave and convex portion 155.

In addition, as illustrated in FIG. 12B, link arms 147 and 148 are attached to the lower concave and convex portion 155 to form a parallel link structure. Accordingly, the lower concave and convex portion 155 is movable up and down in a parallel state. Torsion springs 171 and 172 are attached to the link arms 147 and 148, respectively, and urge the link arms with a force in a rotation direction. Accordingly, the link arms act a force on the lower concave and convex portion 155 to lift up the lower concave and convex portion 155 in an up direction. Namely, the lower concave and convex portion 155 maintains a state where the lower concave and convex portion 155 is fitted to the upper concave and convex portion 156, and the interval therebetween is small when no object is present. Incidentally, instead of the torsion springs, another member may be used to generate a force to cause the upper and lower concave and convex portions to be fitted to each other (for example, a structure where the upper and lower concave and convex portions are connected to each other by tension springs).

As illustrated in FIG. 12C, when any object (for example, the card 2) is inserted, the lower concave and convex portion 155 is pushed in a down direction against the spring forces of the torsion springs 171 and 172, and the lower concave and convex portion 155 is lowered. Accordingly, the light-shielding levers 143 and 144 is also lowered (not illustrated). Even when an object is present on an end portion of the lower concave and convex portion 155, due to a parallel link mechanism, the lower concave and convex portion 155 is lowered while maintaining a parallel state as a whole. Since the interval between the lower concave and convex portion 155 and the upper concave and convex portion 156 is widened by this lowering, a change in the interval is detected, so that the presence of the object can be detected.

Then, in a state where the object is detected, when the card 2 is not inserted, it can be determined that any foreign object other than the card is present.

Figure 13:
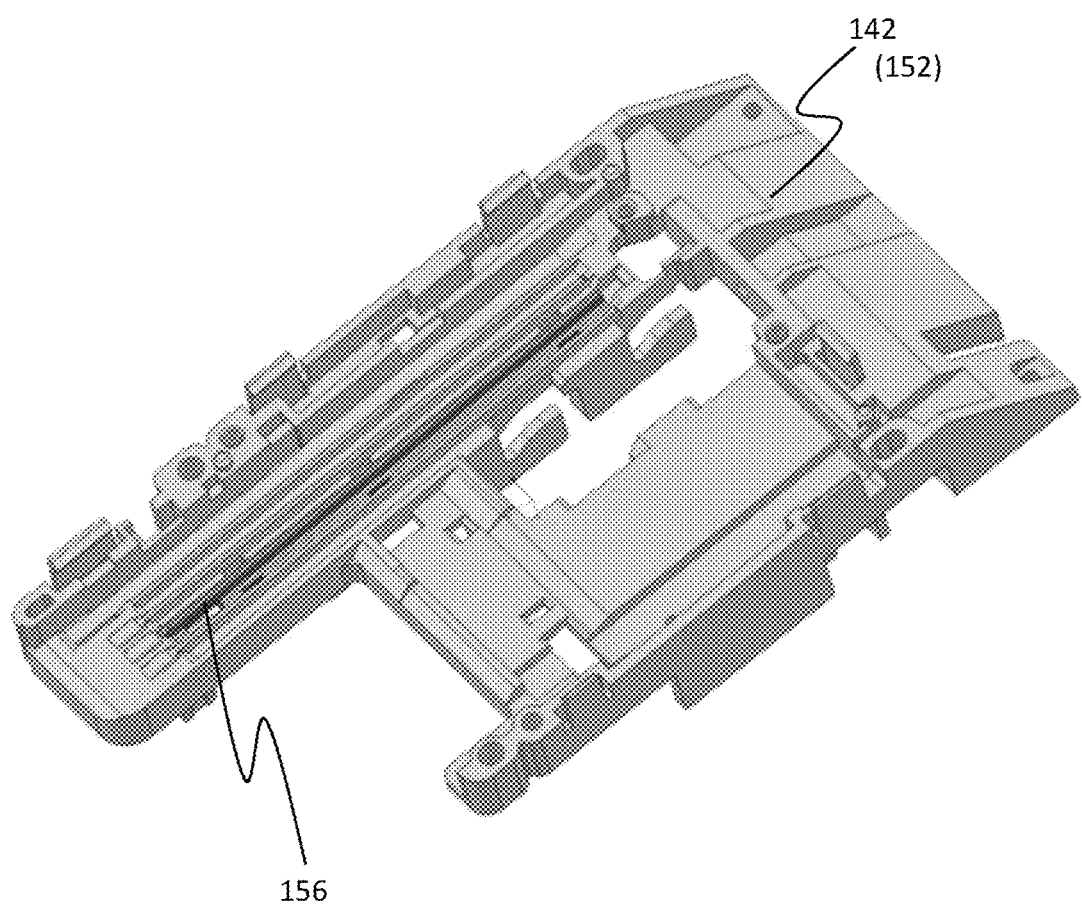
FIG. 13 is an internal perspective view of the card reader in the first embodiment.

FIG. 13 is a view of the upper frame 142 in FIG. 10 when seen from a lower side in the Z direction, and the upper frame 142 includes the upper concave and convex portion 156 to be fitted to the lower concave and convex portion 155 of the lower frame 141.

Figure 14:
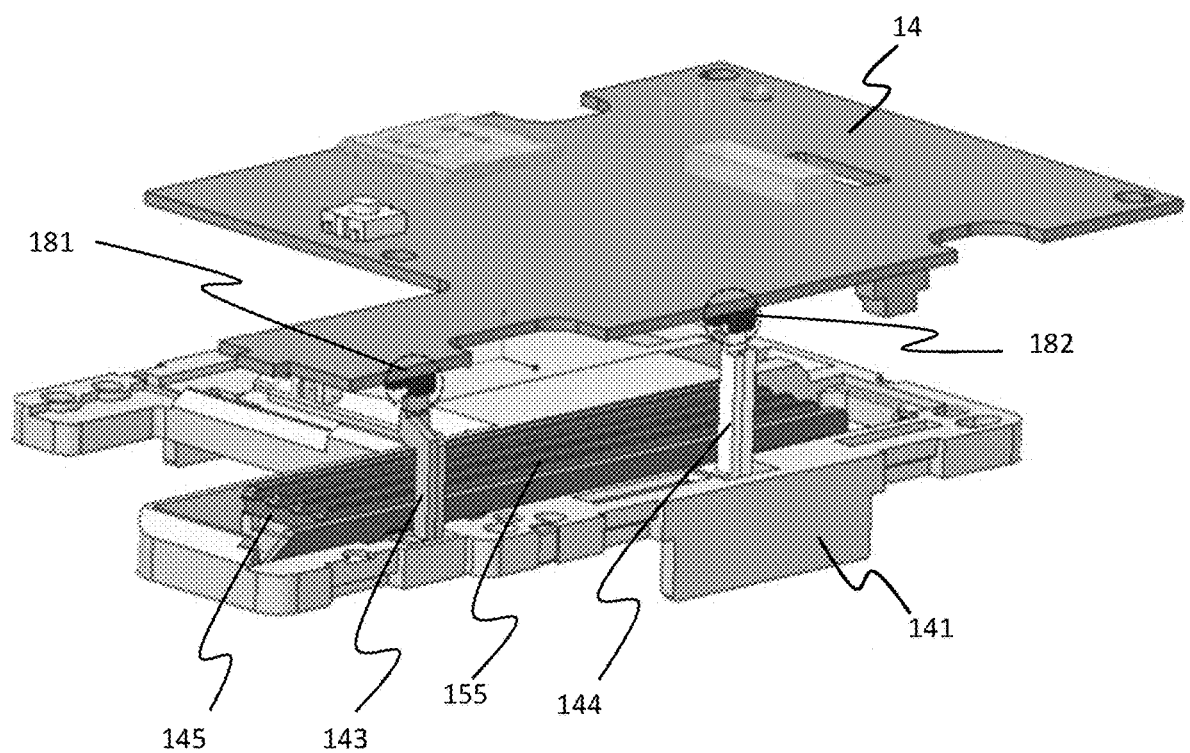
FIG. 14 is an internal perspective view of the card reader in the first embodiment.

FIG. 14 illustrates a state where optical sensors 181 and 182 attached at positions where the optical sensors 181 and 182 are turned on and off by an up and down displacement (displacement in the Z direction) of the light-shielding levers 143 and 144 are attached to the printed substrate 14. In this drawing, the upper frame 142 is not illustrated to make it easier to see. Both the optical sensors 181 and 182 are formed of a light-emitting unit and a light-receiving unit, and each of upper tip portions of the light-shielding levers 143 and 144 is located between the light-emitting unit and the light-receiving unit in a card insertion standby state to set a light shielding state (OFF) (corresponding to FIG. 8A). Then, when any object such as a card or a foreign object is inserted, the lower concave and convex portion 155 is pushed down and accordingly, the light-shielding levers 143 and 144 is also lowered. For this reason, the tip portions are extracted from gaps between the light-emitting units and the light-receiving units of the optical sensors 181 and 182 to set the optical sensors 181 and 182 in a light projection state (ON) (corresponding to FIG. 8B), so that it can be detected that the object (a card or a foreign object) is inserted.

Incidentally, since the parallel link mechanism (formed of the link arms 147 and 148 and the like) is provided to allow the lower concave and convex portion 155 to move up and down while maintaining a parallel state, only one optical sensor is sufficient for detection in principle; however, in consideration of a possibility that a foreign object cannot be accurately detected due to the position or shape of the foreign object, a device assembly tolerance, a backlash caused by degradation over time, or the like, in the first embodiment, a plurality (here, the optical sensors 181 and 182) of detection sensors are provided along the conveyance direction of the card. Three or more detection sensors may be provided.

In addition, the lower concave and convex portion 155 and the upper concave and convex portion 156 are partially or wholly made of metal to make it difficult that the inside of the card reader is ground with a file or the like to secure a space where a skimmer is installed, so that such an illegal act can be prevented.

According to the first embodiment of the present invention described above, since the lower concave and convex portion and the upper concave and convex portion are set in a fitted state, and a large change in the interval therebetween can be generated when an object is inserted, with a simple configuration, it is possible to reliably detect the object inserted into and attached to the inside of the card reader (rear side of the reading unit). Then, when the presence of an object is detected in a state where the card is not inserted, it can be determined that the foreign object is inserted. For example, when the detection sensor is operated by a check command or the like from a higher-level device (not illustrated), and the detection sensor detects that the interval between the upper and lower concave and convex portions is widened in a state where the card cannot be present inside the device (case other than a transaction operation or the like), it can be determined that a foreign object such as a skimmer is inserted. In addition, when the detection sensor is always operated, and a state occurs in which the detection sensor detects an object in a state where the card cannot be present in the device, a control unit (disposed on the printed substrate 14) of the card reader 1 is capable of voluntarily reporting (notifying) detection of abnormality (detection of a foreign object) to the higher-level device. In addition, the presence of a foreign object may be displayed on a display device or an alarm sound may be generated by a buzzer or the like.

Second Embodiment

Next, a second embodiment of the present invention will be described with reference to FIGS. 15A and 15B. Since a basic configuration of the second embodiment is the same as that of the first that has been already described, a description thereof will be omitted and here, configurations that are different from those of the first embodiment will be described.

Figure 15A:
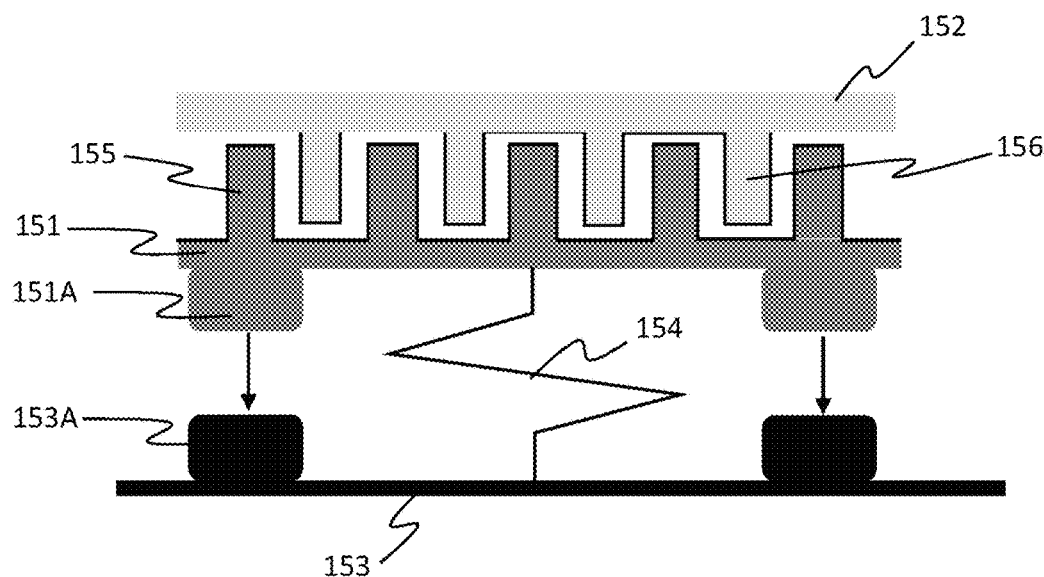
FIGS. 15A and 15B are enlarged front views of a card reader in a second embodiment of the present invention.
Figure 15B:
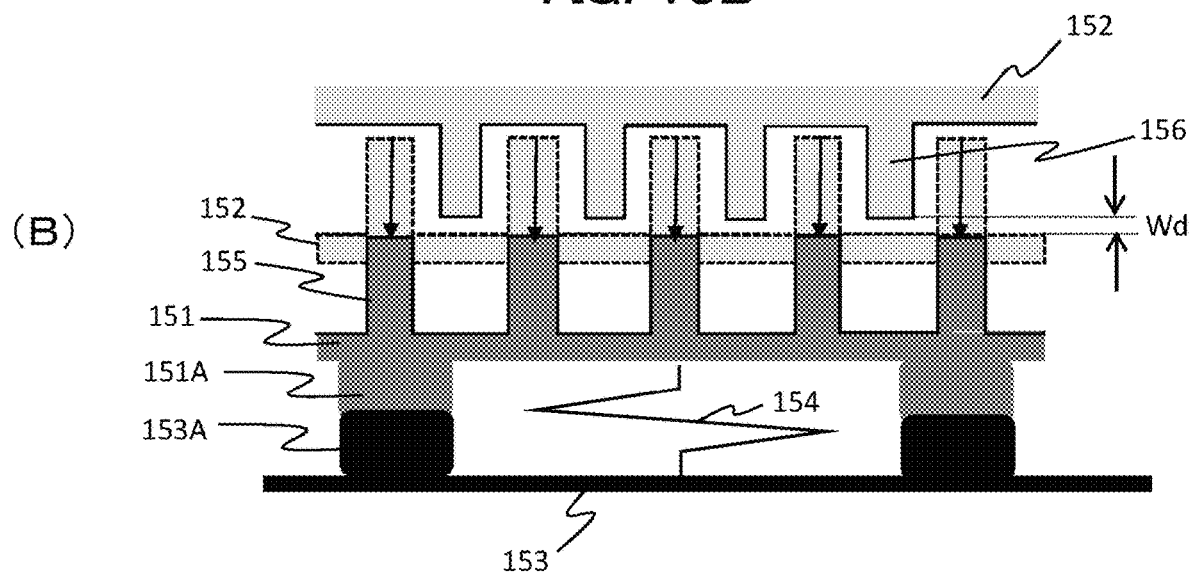

FIGS. 15A and 15B are drawings corresponding to FIGS. 7A and 7B in the first embodiment, and illustrate enlarged schematic views of the protruding portion 12 of the card insertion slot 11 when seen from the front. The magnetic head 121 that reads card information of the magnetic stripe is attached to the protruding portion 12.

In the second embodiment, a height adjusting portion 151A on a conveyance path side and a height adjusting portion 153A on a base side are provided on the lower conveyance path 151 and the base 153, respectively. The second embodiment is different in this point from the first embodiment. The height adjusting portions 151A 153A facing each other limit a movable range of the lower conveyance path 151 in the down direction, and a gap (namely, a gap for card insertion) between a lower end of the upper concave and convex portion 156 and an upper end of the lower concave and convex portion 155 is Wd in a state where the lower conveyance path is lowered to a maximum limit.

Here, when the thickness of the card is We including an error and a minimum thickness of a foreign object such as a skimmer is Ws, if Wd<(Wd+Ws) is satisfied, the card cannot be inserted in a state where the foreign object such as a skimmer is inserted, so that it is possible to prevent the card from being inserted and from card information from being illegally read without noticing that the skimmer is attached inside the card reader.

According to the second embodiment, it is possible to exhibit the effects of the first embodiment, and to prevent illegal reading of card information even if the detection sensor does not function properly due to a failure (lifespan) or even if a skimmer detection function is not applied as the operation of the device.

Incidentally, the height adjusting portions 151A and 153A can be integrally molded with the lower conveyance path 151 and the base 153, respectively. In addition, the configuration may be such that the height adjusting portions 151A and 153A can be removed from the lower conveyance path 151 and the base 153, respectively, thereby being able to adjust the height of the gap Wd.

Third Embodiment

Figure 16:
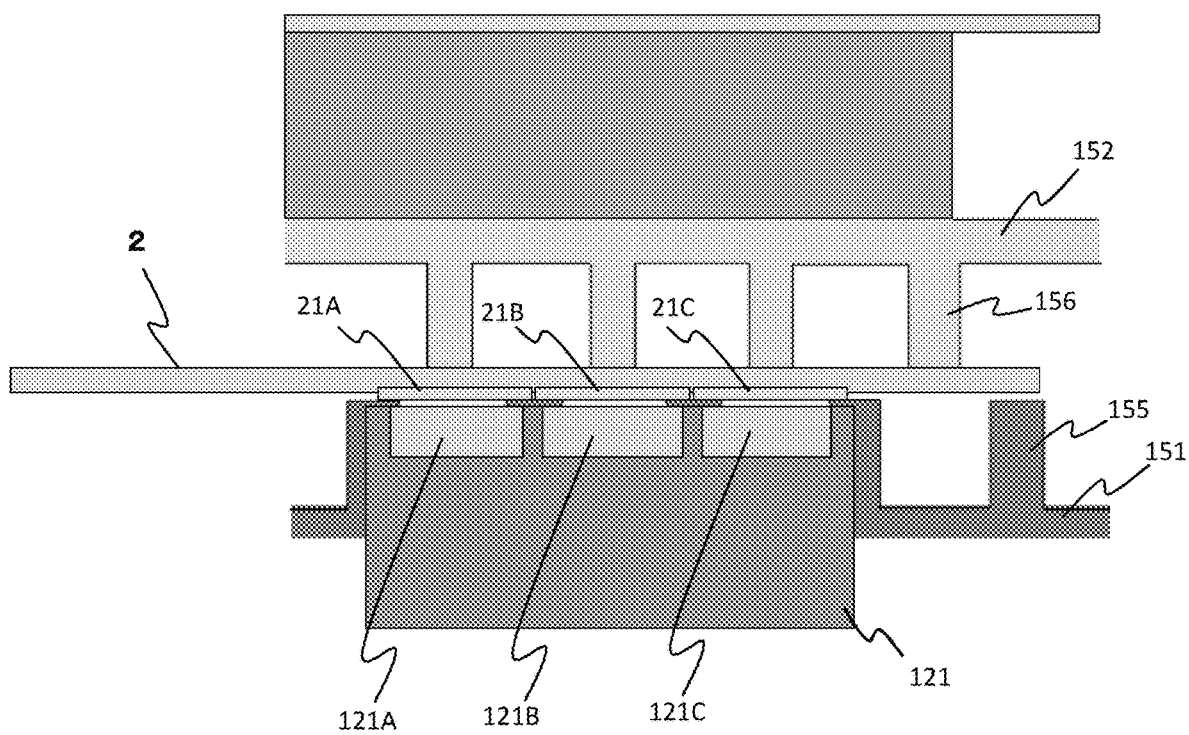
FIG. 16 is an enlarged front view of a card reader in a third embodiment of the present invention.

Next, a third embodiment of the present invention will be described with reference to FIG. 16. FIG. 16 is a view illustrating the third embodiment of the present invention. Since a basic configuration of the third embodiment is the same as that of the first that has been already described, a description thereof will be omitted and here, configurations that are different from those of the first embodiment will be mainly described.

In the configurations of the embodiments, when the card is inserted, there is a possibility that the magnetic stripe 21 on the back surface of the card 2 and the lower concave and convex portion 155 come into contact with each other. For this reason, there is a possibility that when the card 2 is repeatedly inserted and removed, the magnetic stripe portion of the card 2 is scraped due to contact with the lower concave and convex portion 155 and long term use of the card interferes with the reading of card information recorded on the magnetic stripe (degradation). In order to avoid this possibility, the third embodiment adopts a configuration in which concave portions of the lower concave and convex portion 155 are disposed to correspond to centers of magnetic data of tracks of the magnetic stripe to prevent degradation of the card information (magnetic data) recorded on the magnetic stripe.

FIG. 16 illustrates a specific configuration of the magnetic head 121 of the third embodiment, and illustrates an enlarged schematic view seen in a direction of the card insertion slot. The card 2 includes the magnetic stripe 21 on the back surface thereof. In this example, the magnetic stripe 21 includes three tracks 21A, 21B, and 21C. On the other hand, the magnetic head 121 provided on a card reader side also includes three magnetic heads 121A, 121B, and 121C corresponding to those tracks.

As illustrated in FIG. 16, the concave portions of the lower concave and convex portion 155 are disposed to face central portions of the three tracks 21A to 21C of the magnetic stripe of the card 2. Accordingly, even when a lower surface of the card 2 comes into contact with the lower concave and convex portion 155, the portions of the tracks 21A to 21C forming the magnetic stripe 21 of the card 2 do not come into contact with the lower concave and convex portion 155, so that degradation caused by abrasion can be prevented. Since the three magnetic heads 121A to 121C are provided at positions where the three magnetic heads 121A to 121C read the vicinities of the central portions of the tracks, even when abrasion is generated in other portions, the magnetic data can be satisfactorily read.

In such a manner, according to the third embodiment of the present invention, it is possible to exhibit the effects of the first embodiment, and to prevent degradation caused by abrasion of the magnetic stripe of the card.

What is claimed is:

1. A card reader comprising:
   a card conveyance path formed of an upper conveyance section and a lower conveyance section to take a card that is inserted, into a device; and
   a reading unit that reads information recorded on the card,
   wherein first planoconvex protrusions protrude up from an upper surface of the lower conveyance section behind the reading unit at regularly spaced intervals into the card conveyance path, and second planoconvex protrusions protrude down from a lower surface of the upper conveyance section at regularly spaced intervals into the card conveyance path to be fitted to the first planoconvex protrusions,
   first planoconvex protrusions and the second planoconvex protrusions are configured to maintain a fitted state—such that when no object is present in the card conveyance path between the first planoconvex protrusions and the second planoconvex protrusions, the second planoconvex protrusions are biased and fill the regularly spaced intervals between the first planoconvex portions, and the first planoconvex portions are biased and fill the regularly spaced intervals between the second planoconvex protrusions, and
   a detection sensor is provided that detects a change in a distance between a top of the first planoconvex portions and a bottom on the second planoconvex portions upon insertion of an object into the conveyance path.

2. The card reader according to claim 1,
   wherein the reading unit is a magnetic head that reads information recorded on a magnetic stripe formed on the card.

3. The card reader according to claim 2,
   wherein a laterally central portion of each track of the magnetic stripe of the card is configured to face the first planoconvex portions.

4. The card reader according to claim 1,
   wherein the detection sensor is formed of a detection body that moves in response to a relative change in the distance between the first planoconvex portions and the second planoconvex portions in an up-down direction, and a position detection sensor that detects a movement of the detection body.

5. The card reader according to claim 4,
   wherein the detection body is a light-shielding plate, and the position detection sensor is an optical sensor that detects a change in a position of the light-shielding plate.

6. The card reader according to claim 4,
   wherein the position detection sensor is a proximity sensor that detects whether or not the detection body has approached the proximity sensor.

7. The card reader according to claim 1,
   wherein in order to maintain the fitted state, a parallel link mechanism is formed that supports the first planoconvex protrusions using a plurality of link arms, and a spring is provided that applies a force to move the first planoconvex protrusions upward.

8. The card reader according to claim 1,
   wherein a plurality of the detection sensors are provided along a conveyance direction of the card.

9. The card reader according to claim 1,
   wherein the first planoconvex protrusions and the second planoconvex protrusions are partially or wholly made of metal.

10. The card reader according to claim 1,
    wherein in a state where the detection sensor detects a maximum value of the distance, a distance between an upper end surface of the first planoconvex protrusions and a lower end surface of the second planoconvex protrusions is set to be equal to or less than a magnitude of a sum of a thickness of the card and of a thickness of a foreign object.

11. A foreign object detection method for a card reader including a card conveyance path formed of an upper conveyance section and a lower conveyance section to convey a card that is inserted, into a device, and a reading unit that reads information recorded on the card,
    wherein first planoconvex protrusions protrude up from the lower conveyance section behind the reading unit at regularly spaced intervals into the card conveyance path, and second planoconvex protrusions protrude down from the upper conveyance section at regularly spaced intervals into the card conveyance path to be fitted to the first planoconvex protrusions are provided,
    first planoconvex protrusions and the second planoconvex protrusions are configured to maintain a fitted state—such that when no object is present in the card conveyance path between the first planoconvex protrusions and the second planoconvex protrusions, the second planoconvex protrusions are biased and fill the regularly spaced intervals between the first planoconvex portions, and the first planoconvex portions are biased and fill the regularly spaced intervals between the second planoconvex protrusions,
a change in a distance between a top of the first planoconvex portions and a bottom on the second planoconvex portions upon insertion of an object into the conveyance path, and
when the card is not inserted and the change in the distance is detected, it is determined that a foreign object is present.

12. The foreign object detection method for a card reader according to claim 11,
wherein the reading unit is a magnetic head that reads information recorded on a magnetic stripe formed on the card.

13. The foreign object detection method for a card reader according to claim 11,
wherein the change in the distance is detected by a position sensor that detects a movement of a detection body that moves in response to a relative positional movement of the first planoconvex portions and the second planoconvex portions in an up-down direction.

14. The foreign object detection method for a card reader according to claim 11,
wherein the change in the distance between the first planoconvex portions and the second planoconvex portions is detected by a plurality of detection sensors installed in a conveyance direction.

15. The foreign object detection method for a card reader according to claim 11,
wherein when it is determined that the foreign object is present, the presence of the foreign object is reported.

* * * * *